(12) United States Patent
Varekamp

(10) Patent No.: US 11,232,567 B2
(45) Date of Patent: Jan. 25, 2022

(54) BIOLOGICAL OBJECT DETECTION

(71) Applicant: KONINKLIJKE PHILIPS N.V., Eindhoven (NL)

(72) Inventor: Christiaan Varekamp, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 496 days.

(21) Appl. No.: 16/306,251

(22) PCT Filed: May 24, 2017

(86) PCT No.: PCT/EP2017/062499
§ 371 (c)(1),
(2) Date: Dec. 7, 2017

(87) PCT Pub. No.: WO2017/207373
PCT Pub. Date: Dec. 7, 2017

(65) Prior Publication Data
US 2021/0224990 A1     Jul. 22, 2021

(30) Foreign Application Priority Data

Jun. 3, 2016    (EP) ..................................... 16172787

(51) Int. Cl.
    *G06K 9/00*         (2006.01)
    *G06T 7/00*          (2017.01)
    *G06T 7/11*          (2017.01)

(52) U.S. Cl.
CPC .............. *G06T 7/0014* (2013.01); *G06T 7/11* (2017.01); *G06T 2207/20036* (2013.01); *G06T 2207/30024* (2013.01)

(58) Field of Classification Search
CPC ..................... G06T 7/0014; G06T 7/11; G06T 2207/30024; G06T 2207/20036; G06T 7/0012; G06T 7/0081; G06T 2207/20141
(Continued)

(56) References Cited

U.S. PATENT DOCUMENTS 6,681,035 B1    1/2004   Bamford
7,050,620 B2    5/2006   Heckman
(Continued)

FOREIGN PATENT DOCUMENTS

CN       103353938 A     10/2013
EP        846306 A1      6/1998
(Continued)

OTHER PUBLICATIONS

Duarte Barbieri P. et al: "Vertebral Body Segmentation of Spine MR Images Using Superpixels", 2015 IEEE 28th International Symposium on Computer-Based Medical Systems, Jun. 1, 2015 (Jun. 1, 2015), pp. 44-49, XP055325065, (Year: 2015).*
(Continued)

*Primary Examiner* — Van D Huynh
(74) *Attorney, Agent, or Firm* — Sherry Austin

(57) ABSTRACT

As the capabilities of digital histopathology machines grows, there is an increasing need to ease the burden on pathology professionals of finding interesting structures in such images. Digital histopathology images can be at least several Gigabytes in size, and they may contain millions of cell structures of interest. Automated algorithms for finding structures in such images have been proposed, such as the Active Contour Model (ACM). The ACM algorithm can have difficulty detecting regions in images having variable colour or texture distributions. Such regions are often found in images containing cell nuclei, because nuclei do not always have a homogeneous appearance. The present application describes a technique to identify inhomogeneous structures, for example, cell nuclei, in digital histopathology information. It is proposed to search pre-computed superpixel information using a morphological variable, such as a shape-compactness metric, to identify candidate objects.

18 Claims, 9 Drawing Sheets

(58) Field of Classification Search
USPC .......................................................... 382/133
See application file for complete search history.

(56) References Cited

U.S. PATENT DOCUMENTS

| | | | |
|---|---|---|---|
| 7,881,532 B2 | 2/2011 | Zahniser | |
| 8,319,793 B2 | 11/2012 | Schaepe | |
| 9,389,311 B1* | 7/2016 | Moya | G01S 13/90 |
| 9,418,440 B2 | 8/2016 | Sagawa | |
| 10,312,465 B2 | 6/2019 | Ning | |
| 10,573,017 B2* | 2/2020 | Tian | G06T 7/596 |
| 2002/0164063 A1* | 11/2002 | Heckman | G06T 7/0012 |
| | | | 382/133 |
| 2006/0050947 A1* | 3/2006 | Petrou | G06T 7/0012 |
| | | | 382/133 |
| 2008/0187198 A1 | 8/2008 | Grady | |
| 2010/0265267 A1 | 10/2010 | Schaepe | |
| 2013/0301898 A1 | 11/2013 | Jain | |
| 2015/0078648 A1 | 3/2015 | Lee | |
| 2015/0234863 A1* | 8/2015 | Lilje | G06K 9/00637 |
| | | | 382/103 |
| 2016/0171707 A1* | 6/2016 | Schwartz | G06K 9/342 |
| | | | 382/180 |
| 2017/0300617 A1* | 10/2017 | Georgescu | G06T 7/11 |
| 2017/0372117 A1* | 12/2017 | Bredno | G06K 9/4642 |
| 2018/0012365 A1* | 1/2018 | Chefd'hotel | G06T 7/12 |
| 2018/0278957 A1* | 9/2018 | Fracastoro | H04N 19/60 |

FOREIGN PATENT DOCUMENTS

| | | |
|---|---|---|
| EP | 0858051 A2 | 8/1998 |
| EP | 1285385 B1 | 2/2003 |
| JP | 2004286666 A | 10/2004 |
| JP | 2006301779 A | 11/2006 |
| WO | WO2017106106 A1 | 6/2017 |

OTHER PUBLICATIONS

Windisch G et al., "Improvement of Texture Based Image Segmentation Algorithm for HE Stained Tissue Samples", 2013 IEEE 14th International Symposium on Computational Intelligence and Informatics (Cinti), IEEE, Nov. 19, 2013 (Nov. 19, 2013), pp. 273-279,XP032545149 (Year: 2013).*

Achanta, R et al., "SLIC Superpixels Compared to State-of-the-Art Superpixel Methods", IEEE Transactions on Pattern Analysis and Machine Intelligence, IEEE Computer Society, USA, vol. 34, No. 11, Nov. 1, 2012 (Nov. 1, 2012), pp. 2274-2282, XP011490750 (Year: 2012).*

Parag Toufiq et al., "Small Sample Learning of Superpixel Classifiers for EM Segmentation", Sep. 14, 2014 (Sep. 14, 2014), Network and Parallel Computing; [Lecture Notes in Computer Science; Lect. Notes Computer], Springer International Publishing, Cham, pp. 389-397, XP047312248 (Year: 2014).*

PCT International Search Report, International application No. PCT/EP2017/062499, dated Jul. 10, 2017.

Observations on the PCT International Search Report and the Written Opinion of International Application No. PCT/EP2017/062499, dated Jun. 4, 2018.

Duarte Barbieri P. et al: "Vertebral Body Segmentation of Spine MR Images Using Superpixels", 2015 IEEE 28th International Symposium on Computer-Based Medical Systems, Jun. 1, 2015 (Jun. 1, 2015), pp. 44-49, XP055325065.

Windisch G et al., "Improvement of Texture Based Image Segmentation Algorithm for HE Stained Tissue Samples", 2013 IEEE 14th International Symposium on Computational Intelligence and Informatics (CINTI), IEEE, Nov. 19, 2013 (Nov. 19, 2013), pp. 273-279,XP032545149.

Achanta, R et al., "SLIC Superpixels Compared to State-of-the-Art Superpixel Methods", IEEE Transactions on Pattern Analysis and Machine Intelligence, IEEE Computer Society, USA, vol. 34, No. 11, Nov. 1, 2012 (Nov. 1, 2012), pp. 2274-2282, XP011490750.

Parag Toufiq et al., "Small Sample Learning of Superpixel Classifiers for EM Segmentation", Sep. 14, 2014 (Sep. 14, 2014), Network and Parallel Computing; [Lecture Notes in Computer Science; Lect. Notes Computer], Springer International Publishing, Cham, pp. 389-397, XP047312248.

Grady, L. et al., "Isoperimetric Graph Partitioning for Image Segmentation", IEEE Transactions on Pattern Analysis and Machine Intelligence, vol. 28, No. 3, Mar. 2006, pp. 469-475.

Achanta et al., "SLIC Superpixels Compared to State-of-the-Art Superpixel Methods", IEEE Transactions on Pattern Analysis and Machine Intelligence, vol. 34, No. 11, pp. 2274-2282, Nov. 2012.

"Isoperimetric Inequality", Wikipedia, Downloaded from the Internet Nov. 21, 2018 https://en.wikipedia.org/wiki/Isoperimetric_inequality.

Takemura S.Y. et al., "A Visual Motion Detection Circuit Suggested by *Drosophila* Connectomics", Nature 500 (7461), pp. 175-181, 2013.

Su H. et al., "Interactive Cell Segmentation Based on Active and Semi-Supervised Learning", IEEE Transactions on Medical Imaging, vol. 35, No. 3, IEEE, Mar. 2016, pp. 762-777.

Tian X. et al., "Point-Cut: Fixation Point-Based Image Segmentation Using Random Walk Model", 2015 IEEE International Conference on Image Processing (ICIP), Sep. 3, 2015, pp. 2125-2129.

Yamada K. et al., "Regional Extraction Based on Features of each Connected Component of a Gray-Scale Image", The Institute of Electronics, Information and Communication Engineers, Technical Report, vol. 93, No. 479, 1994.

\* cited by examiner a) b)

BIOLOGICAL OBJECT DETECTION

CROSS-REFERENCE TO RELATED APPLICATIONS

This patent application claims the priority benefit under 35 U.S.C. § 371 of international patent application no. PCT/EP2017/062499, filed May 24, 2017, which claims the priority benefit of European patent Application No. 16172787.0, filed on Jun. 3, 2016, the contents of which are herein incorporated by reference.

FIELD OF THE INVENTION

This invention relates generally to a diagnosis assistance system configured to identify a contour of a biological object in image information, to an image processing method for identifying a contour of a biological object in image information, and additionally a computer program element for controlling a processing unit, and a computer-readable medium.

BACKGROUND OF THE INVENTION

Digital pathology seeks to increase the automation of the difficult process of identifying objects in pathology slides containing samples taken from human or animal patients. Digital pathology is difficult because improvements in acquisition hardware have enabled pathology slides of many gigabytes in size to be recorded. Such slides typically contain hundreds of thousands, or millions of targets of potential interest to a medical professional.

One approach to detect the boundary of objects in digital pathology images is via the use of so called "seed regions". These seed regions are typically based on a pixel intensity analysis followed by morphological image processing steps. Once initial seed regions have been identified in the digital image, the object boundary can be searched for. Typical approaches to do this use Active Contour Models (ACM). ACMs can accurately find the boundary of objects in a digital pathology image. The ACM technique functions by imposing smoothness on a boundary of a potential object of interest. An energy minimization function can be used to find the final boundary of the object.

While the ACM method can be useful in general, its success depends on the quality of the initial seed region chosen, and on the exact intensity pattern of the boundary. For pathology images with "open-cell structures", the ACM approach may not always find the correct boundary. Moreover, ACM is not always computationally efficient, and may for that reason not be a good choice for an interactive object selection system.

US 2006/0050947 A1 discusses a histopathological assessment method to identify potential cell nuclei. This method uses principle component analysis to derive monochromatic image data, followed by Otsu thresholding, to produce a binary image. Digital pathology image processing methods can, however, be further improved.

SUMMARY OF THE INVENTION

According to a first aspect, there is provided a diagnosis assistance system configured to identify a contour of a biological object in image information. The diagnosis system comprises:
 a processing unit.

The processing unit is configured to receive image information which has been segmented into super-pixels, to select an initial set of super-pixels in the image information at an initial location in the image information, to determine a first morphological variable of the initial set of super-pixels, to identify a further set of super-pixels adjacent to a super-pixel of the initial set of super-pixels at a further location in the image information, to generate a second morphological variable of the union of the initial set and the further set of super-pixels, and, if a comparison of the second morphological variable to the first morphological variable indicates that the union of the initial set and the further set have an increased shape compactness, to define the contour of the biological object in the image information as the boundary of the union of the initial set and the further set of super-pixels.

An effect is an improved accuracy in contour detection in biological image information, because the approach is not primarily based on grouping super-pixels based on a texture or intensity analysis. This is advantageous in the case of the detection of cell nuclei in a digital pathology image, for example. When contained in a digital pathology image, cell nuclei can appear to have a variable colour and intensity regions within the areas defining the cell nuclei. ACM approaches could fail to identify the boundary of a nucleus. Therefore, the proposed approach is not dependent on whether, or not, two super-pixels in a grouping have different colour intensities, for example. Thus, the application of a diagnosis system according to this approach leads to more accurate detection of the boundary of a biological object having a non-homogeneous colour or texture distribution, such as cell nucleus.

Another effect of the technique is that the super-pixels may be pre-computed offline which allows for an efficient evaluation of shape compactness metrics. In this way, computationally efficient nucleus-finding algorithms can be provided, allowing the technique to operate in a low-latency interactive mode on mobile devices (such as smart phones, for example). Accordingly, a contour of a biological object in image information may be identified in a computationally efficient manner.

Another effect of the technique is that nuclei that have a large interior variation of colour intensity can be reliably detected. The border of such nuclei may be detected more easily, since the approach uses a morphological variable as a criterion for detection, rather than an intensity or texture criterion, when grouping adjacent super-pixels.

According to an embodiment of the first aspect, a diagnosis assistance system is provided as defined in the first aspect, further comprising:
 an input unit.

The input unit is configured to receive an indication of an initial location in the image information from a user, wherein the initial set of super-pixels comprises the super-pixel at the initial location, and wherein the processing unit is further configured to define the contour that results from applying the search algorithm starting at the initial location.

Accordingly, the diagnosis assistance system identifies a contour of the biological object with the assistance of a user to identify an optimal algorithm starting point. Thus, fewer computational cycles are required to find a biological object, for example a cell nucleus.

According to an embodiment of the first aspect, a diagnosis assistance system is provided, wherein the processing unit is further configured to generate the initial location using a random process, and wherein the initial set of super-pixels comprises the super-pixel at the initial location.

Therefore, the algorithm for finding a contour of a biological object in the image information may be applied automatically, without user input.

According to an embodiment of the first aspect, a diagnosis assistance system is provided as described above, wherein the processing unit is further configured to select the initial set of super-pixels and/or the further set of super-pixels by placing a search area at the initial location and/or the further location, and selecting the initial set and/or the further set of super-pixels as the set of super-pixel regions that touch the search area at the initial location and/or the further location.

Accordingly, super-pixels which are candidates for inclusion in the set of super-pixels taken to represent the contour of the biological object to be identified in the image information can be identified if the boundaries of the super-pixels intersect with the search area.

According to an embodiment of the first aspect, there is provided a diagnosis assistance system, wherein the processing unit is further configured to choose the initial location and the further location to provide a search path for constraining the placement of the search areas in the image information, wherein the search path is one of: an outward spiral pattern, a random walk, or an outwardly-expanding set of circles.

Accordingly, identification of further super-pixels in the biological image information is more likely, or possible in fewer computational steps, because different search patterns may have advantageous properties in certain types of biological image information. In particular, a random walk has advantages for finding elongate nuclei, whereas outwardly expanding spirals, or circle patterns, may have advantages finding circular nuclei.

According to an embodiment of the first aspect, the diagnosis assistance system is provided as described above, wherein the processing unit is further configured to iterate until the second morphological variable reaches a stopping value, or until a pre-set number of iterations have been completed.

Accordingly, in a case where an iteration is performed until the second morphological variable reaches a stopping value, an optimum value of the second morphological variable is identified, enabling a higher certainty that a biological object of interest has been identified in the image information. Alternatively, if a pre-set number of iterations have been completed, the second morphological variable of an object in the image information can be identified with an efficient number of iterations, improving the computational efficiency of the algorithm.

According to an embodiment of the first aspect, a diagnosis assistance system is provided as discussed above, wherein the processing unit is further configured to generate a plurality of initial locations, and to define a plurality of candidate contours of biological objects in the image information starting from each respective initial location of the plurality of initial locations, to display the plurality of candidate contours to a user, to receive a user input to select a subset of contours in the plurality of candidate contours, and to generate supervised learning information based on the plurality of candidate contours and the selected subset of contours.

Accordingly, a large number of contours of biological objects of interest may be identified in the image information. These may be presented to a user, and the system may apply automated learning principles to improve identification of contours of biological objects of interest in the image information.

According to an embodiment of the first aspect, a diagnosis assistance system is provided as described above, wherein the first morphological variable is the isoperimetric quotient of the initial set, and the second morphological variable is the isoperimetric quotient of the union of the initial set and the further set.

The isoperimetric quotient is a measure of shape compactness. By pre-computing and storing edge lengths for adjacent super-pixel pairs, the identification of contours can be done efficiently, which is particularly important when image files are extremely large, and the number of contours of biological objects to be identified is also large.

According to an embodiment of the first aspect, the first morphological variable is the boundary curvature of the initial set, and the second morphological variable is the boundary curvature of the union of the initial set and the further set. Optionally, the boundary curvature is found by summing the boundary curvature over all points on a contour of the initial set and/or the further set.

According to an embodiment of the first aspect, there is provided a diagnosis assistance system as previously described, wherein the image information contains a microscopic image of a tissue sample, and the contour corresponds to a wall of a cell nucleus.

Accordingly, digital pathology images may be searched for cell nucleus images much more effectively.

According to a second aspect, there is provided an image processing method for identifying a contour of a biological object in image information. The image processing method comprises:

a) receiving image information which has been segmented into super-pixels;

b) selecting an initial set of super-pixels in the image information at an initial location in the image information;

c) determining a first morphological variable of the initial set of super-pixels;

d) identifying a further set of super-pixels adjacent to a super-pixel of the initial set of super-pixels at a further location in the image information;

e) generating a second morphological variable of the union of the initial set and the further set of super-pixels;

f) if a comparison of the second morphological variable to the first morphological variable indicates that the union of the initial set and the further set have an increased shape compactness, to define the contour of the biological object in the image information as the boundary of the union of the initial set and the further set of super-pixels.

Accordingly, an image processing method is provided enabling the identification of a contour of a biological object in image information, for example a contour of a cell nucleus wall, with greater computational efficiency.

According to an embodiment of the second aspect, there is provided an image processing method according to the previous second aspect, wherein in steps b) and/or d), the selection of the initial set of super-pixels and/or the further set of super-pixels is based on:

b1) placing a search area at the initial location and/or the further location;

b2) selecting the initial set and/or the further set of super-pixels as the set of super-pixel regions that touch the search area at the initial location and/or the further location.

According to an embodiment of the second aspect, there is provided an image processing method as discussed according to the second aspects or its embodiments, wherein the first morphological variable is the isoperimetric quotient of the initial set, and the second morphological variable is the isoperimetric quotient of the union of the initial set and the further set.

According to an embodiment of the second aspect, there is provided an image processing method according to one of the second aspects, or its embodiments, described above, wherein the initial location and the further location are chosen to provide a search path for constraining the placement of the search areas in the image information, wherein the search path is one of: an outward spiral pattern, a random walk, or an outwardly-expanding set of circle perimeters.

According to a third aspect, there is provided a computer program element for controlling a processing unit and/or a device defined in the first aspect or its embodiments, which, when the computer program element is executed by the processing unit and/or computer, is adapted to perform the method of the second aspect, or its embodiments.

According to a fourth aspect, there is provided a computer-readable medium having stored the computer program element of the third aspect.

Therefore, it can be seen as a basic idea to receive digital image information of a biological nature which has been segmented into super-pixels, for example taken from a histopathology slide. Then, it is proposed to detect, in the digital image information which has been segmented into super-pixels, a contour of a biological object, for example, a cell nucleus. The detection is performed by successively grouping super-pixels in the biological image information together, depending on how a value of a morphological variable changes. The morphological variable is determined for a given grouping of the super-pixels.

In the following description, the term "contour of a biological object" means a difference detectable in digital image information which defines a boundary of an item such as a cell nucleus, at a certain location in the image. In the case of a cell nucleus, a single nucleus may have a variable shape, such as circular, elliptical or otherwise. Nuclei may vary in size. The nucleus of an epithelial cell can be much larger (up to 5 times larger) than the nucleus of an infiltrate immune cell, for example. Therefore, a contour is any line in biologically derived digital image information which can distinguish between the inside and the outside of a biological object such as a cell nucleus. Such a line may even be a "broken" (discontinuous) line corresponding to a burst nucleus.

In the following description, the term "image information" may refer to digital information which, when rendered in accordance with an appropriate imaging standard, can be reassembled to provide pixels of a display image showing a biological object. The image information may be compressed according to the RAW standard, for example. The image information may be in BITMAP, or JPEG format, and other formats are known to the person skilled in the art.

In the following description, the term "super-pixel" refers to a contiguous region of pixels in image information which has been defined as a contiguous region using a super-pixel segmentation algorithm. Such algorithms are used to partition digital image information into regions that are spatially uniform in terms of colour and/or texture, for example. At a high resolution, cell nuclei, for example, are clearly visible in a haematoxylin and eosin (H&E) image, for example. Super-pixel segmentation can help to segment, and to recognize, parts of cell nuclei in H&E images. In other words, a super-pixel is a contiguous subset of pixels having uniform colour and/or texture, in a set of biological image information pixels.

In the following description, the term "search area" may refer to a portion of image information which can overlap several super-pixels, or only cover one super-pixel of the image information. Alternatively, the "search area" may be considered as a search locus. If boundaries of a super-pixel intersect with the search locus, then the search area may also be considered to "touch" the super-pixel(s).

In the following description, the term first and second "morphological variable" defines metrics which give information about the shape of a super-pixel, or a set of super-pixels.

In the following description, the term "shape compactness" refers to a numerical quantity representing the area of a shape divided by the perimeter of that shape. An ellipse that has very different semi-axis (an eccentric ellipse) would be defined to have a low shape compactness, whereas a perfect circle would have a high shape compactness. Such metrics are applicable to all geometrical shapes and are independent to scale and/or orientation. A common compactness measure is the isoperimetric quotient. This is the ratio of the area of a shape, to the area of a circle having the same perimeter.

BRIEF DESCRIPTION OF THE DRAWINGS

Exemplary embodiments will be described with reference to the following drawings.

DETAILED DESCRIPTION OF EMBODIMENTS

Figure 1:
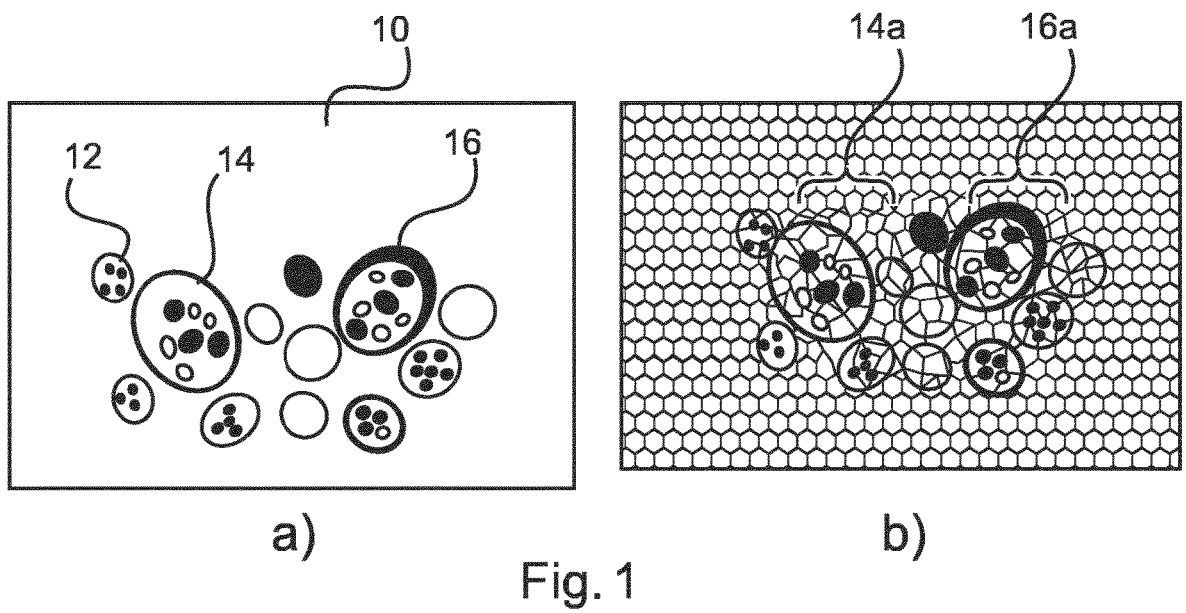
FIGS. 1a) and 1b) show a simulated set of biological image information before and after transformation into super-pixel regions.

Nucleus detection is a difficult problem both for H&E, and for immunohistochemistry (IHC) images. A typical approach is to detect initial locations using image intensity, initialize a contour location and shape, and to apply an Active Contour Model (ACM) to define accurately the boundary of cell nuclei. This approach assumes that useful nucleus candidates have already been detected. Additionally, the final boundary of a nucleus from the candidate nuclei can only be found by imposing smoothness on the boundary, as expressed by an energy minimization function.

This approach may not be the preferred solution in terms of robustness or the algorithm efficiency. Initialization of the contour in the ACM approach can encounter difficulties when the cell under analysis consists of an open structure, in other words, when different parts of the cell or nucleus have a very different colour intensity owing to the ingress of cell cytoplasm, for example.

In such cases, prior art approaches fail to detect contours of biological objects, such as nuclei, because an initial seed region may be positioned unfavourably for the ACM initialization step, or potential initial seed regions are not detected at all. In other words, biological objects, such as cell nuclei, often have variable shapes. They vary in size, and exhibit internal texture and colour variations, leading to an increased chance of finding an incorrect boundary when applying the ACM algorithm.

An approach to solve the above problems is provided according to the aspects described above. The approach will be introduced initially, according to the second aspect, which is an image processing method for identifying a contour of a biological object in image information.

The method according to the second aspect comprises:
a) receiving image information which has been segmented into super-pixels;
b) selecting an initial set of super-pixels in the image information at an initial location in the image information;
c) determining a first morphological variable of the initial set of super-pixels;
d) identifying a further set of super-pixels adjacent to a super-pixel of the initial set of super-pixels at a further location in the image information;
e) generating a second morphological variable of the union of the initial set and the further set of super-pixels;
f) if a comparison of the second morphological variable to the first morphological variable indicates that the union of the initial set and the further set have an increased shape compactness, to define the contour of the biological object in the image information as the boundary of the union of the initial set and the further set of super-pixels.

Accordingly, the detection is not dependent upon colour or texture properties of areas of the biological object in the image information. Instead, it is dependent upon the shape compactness of groups of the super-pixels as they are successively added to the set.

The principle of the image processing approach will now be explained beginning with the method of the second aspect.

FIG. 1a) illustrates a synthetic impression of typical raw digital image information taken from a histopathology slide. FIG. 1a) shows a histopathology slide 10 having a plurality of biological objects, for example such as immune cell nucleus 12, and epithelial cell nuclei such as 14 and 16. The epithelial cell nuclei 14 and 16 contain a plurality of objects having a different size and texture. In a colour image, the objects inside the nuclei could also have different colours.

FIG. 1b) illustrates a resulting super-pixel segmentation of the image information of FIG. 1a). As a result of the differing colours, textures, and sizes, the bodies of the nuclei are partitioned into groups of super-pixels, using a super-pixel segmentation algorithm applied to the biological image information, as seen in FIG. 1b) at 14a and 16a. It may be noted that grouping neighbouring super-pixels based only on a colour, or texture similarity measure will not, in general, enable the secure identification of the nuclei 14 and 16, because many nuclei exhibit a large variation of colour intensity and texture inside the nuclei.

To obtain valid cell nucleus boundaries, it is proposed to apply a new super-pixel grouping approach. After biological image information is received which has been segmented using a super-pixel segmentation algorithm, a set of super-pixels in digital image information which correspond to a cell nucleus boundary 14, 16, for example the super-pixel regions around 14a and 16a, typically form a more compact shape than any other set of super-pixels in another part of the digital image information 10. Therefore, it is proposed to evaluate the shape compactness of multiple sets of super-pixels in the super-pixel segmentation of the digital image information 10, and to define a set of super-pixels that results in a significant shape compactness as being a set of super-pixels that define a region of the digital image information as a cell nucleus.

One measure of shape compactness that can be used as a morphological variable is the so-called isoperimetric quotient, although the skilled reader will understand that other shape-compactness measures could be applied.

An alternative measure for describing a shape that can be used as a morphological variable is the boundary curvature of a super-pixel, or set of super-pixels. By summing the boundary curvature over all points on a contour, a single integral value results, which will also describe the shape.

For a two-dimensional shape, the isoperimetric quotient is defined as the ratio of its area, and that of the circle having the same perimeter. The equation of the isoperimetric quotient is defined in (1):

$$q = \frac{4\pi A}{L} \quad (1)$$

Variable A represents the area of a two two-dimensional shape, and L is the perimeter of the two-dimensional shape. The shape compactness, q, lies in the domain [0,1].

Therefore, a very elongated shape will have a q close to 0, while for a circle, q=1. In the present application, the first morphological variable is the shape compactness of an initial set of super-pixels, and the second morphological variable is the shape compactness of the further set of super-pixels. It will though be appreciated that there are other metrics for the assessment of the first and second morphological variables.

In particular, it is noted that the presently described technique is not restricted to the two dimensional digital image case, and embodiments can apply to three-dimensional biological image information, using a shape compactness measure such as sphericity, for example.

Therefore, although preferred, it is not essential to use the isoperimetric quotient as a morphological variable to assess shape compactness.

A choice of one set of super-pixels with a higher value of q, over another set of super-pixels that have a lower value of q is the basis for the construction of a search algorithm. There are many different approaches to forming candidate sets (proposal groupings) of super-pixels. The common element of the algorithms is that the set of super-pixels is modified with the purpose of maximizing the shape-compactness q. Optionally, the search in the super-pixel sets is ended when q is high enough, at a maximum iteration, or when some other stopping criterion is met.

A detailed example of the search procedure of the present algorithm according to the second aspect will now be provided.

Formally, let S denote the set of super-pixel regions of which the union must define a cell nucleus. An initial input location ($x_0$, $y_0$) in the digital image information is provided. An initial set S is initiated by placing a search area (which may be a shape such as a circle with a radius R) at the location ($x_0$, $y_0$).

The identification of super-pixels lying within, and without, the search area, may be determined in many different ways. For example, if pixels comprised within a certain super-pixel are present within the search area, then that entire certain super-pixel can be designated as being in an initial set. As another example, if a boundary of a super-pixel intersects with the search area, then super-pixels on either side of the boundary can be designated as being in the initial set.

In this example, all super-pixel regions whose boundaries intersect (touch) the search area are added to the set S.

For the initial set S, a first morphological variable denoting the shape compactness of S is calculated. For example, the area of the shape defined be the super-pixels of the initial set S may be calculated by counting the number of pixels in the initial set S. For example, the perimeter of the initial set S may be computed by counting the number of pixels lying on the boundary of the initial set S. As an example, q may be computed according to (1) above, finding the isoperimetric quotient q of the initial set S. Of course, other methods of assessing the values of A and l are possible.

This results in an initial set $S_0$, with an associated shape compactness $q_0$ as the first morphological variable.

In a further step, a subsequent search area (in this example, a circle) at the location $(x_1, y_1)$ is placed close to the initial input location $(x_0, y_0)$.

Now, let $S_1$ denote the set of all super-pixel regions that intersect with the subsequent search area. A second morphological variable (for example, a shape compactness measure like the isoperimetric quotient) is found for the union of sets $S_0$ and $S_1$.

The first morphological variable and second morphological variable are then compared. If the second morphological variable is greater than the first morphological variable, S is redefined as the union of sets $S_0$, and $S_1$. If the second morphological variable stays constant compared the first morphological variable, or decreases, then in this example S is not modified. It will be appreciated by the skilled person that a wide variety of stopping criteria may be provided.

The search areas are, preferably, added in a pre-defined search pattern which is designed to allow a good likelihood of finding a nucleus. Some implementations of search patterns will be discussed subsequently.

Figure 2:
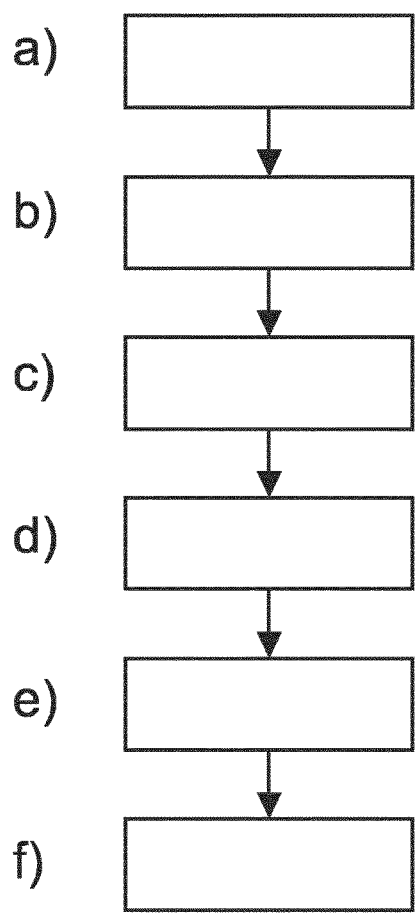
FIGS. 2a) to 2f) show a diagnosis assistance method according to a first aspect.

FIGS. 2a) and 2f) illustrate a method according to the second aspect.

Figure 3A:
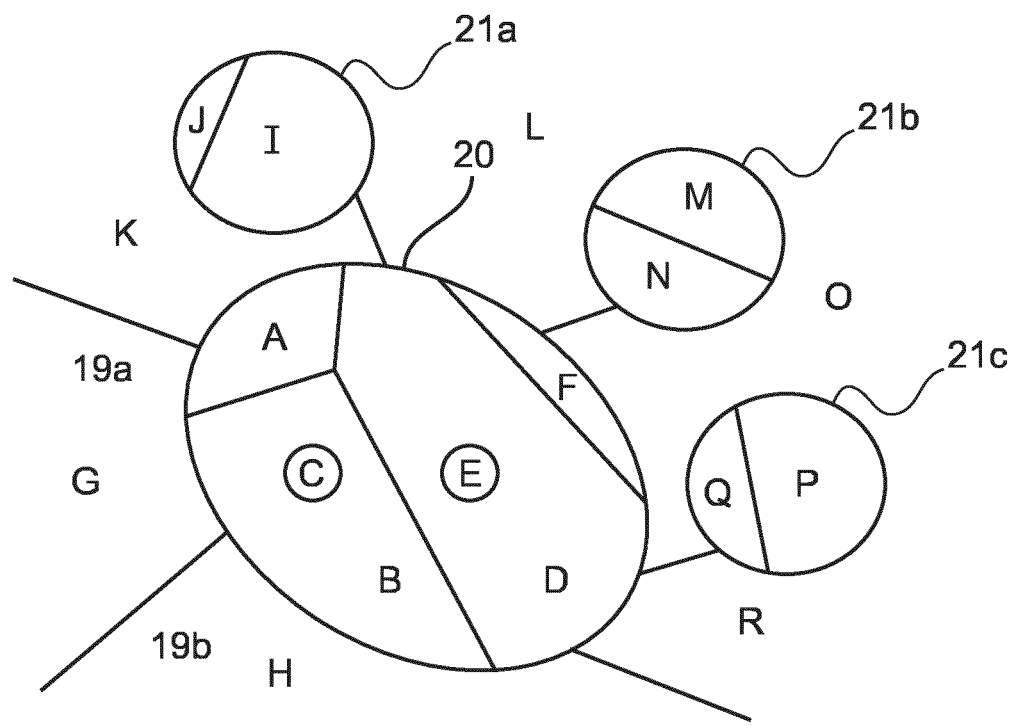
FIGS. 3a) to 3f) show a sequence of images illustrating the operation of a search algorithm according to an example.

FIGS. 3a) to 3f) illustrate iterations of a nucleus detection sequence in digital image information, according to the above-described approach.

FIG. 3a) shows a cell nucleus 20 in digital image information surrounded by smaller cell nuclei 21a, 21b, and 21c, and extracellular matrix regions 19a and 19b. The digital image information has, previously, been segmented into super-pixels A-R.

Super-pixels C and E are intra-nucleus boundaries. In this case, the super-pixel segmentation algorithm has added regions C and E inside the nucleus area, further complicating the process of correctly defining the cell nucleus 20.

Of interest in this example is the contour of the cell nucleus 20. This represents a boundary of cell nucleus 20.

Figure 3B:
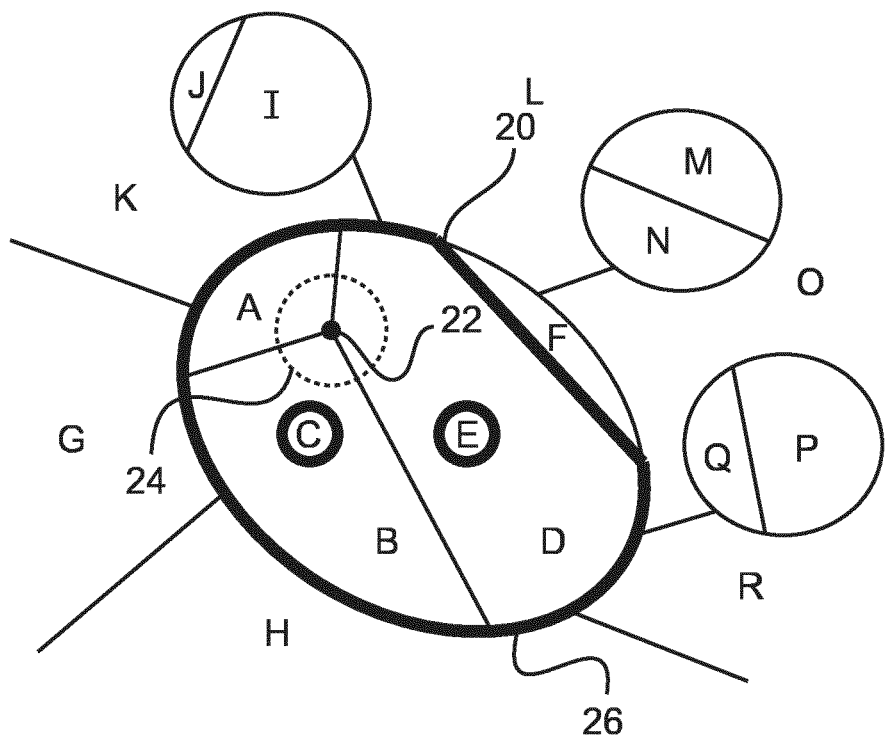

FIG. 3b) shows a first iteration of the search method. An initial location in the image information has been defined at 22 (for example by a user, or a random placement of initial starting locations). The boundary of a first search area 24 (in this case, a circular search area) is shown in this case as a dotted line.

An initial set of super-pixels is defined as the regions A, B, and D, which all have super-pixel areas touching the first search area 24 (in other words, the super-pixel boundaries intersect the boundary of the search area). The super-pixels A, B, and D are defined as the initial set of super-pixels.

The boundary of A, B, and D is defined as the bold line 26. It is noted that C and E are super-pixels contained inside the nucleus boundary 20, which have been segmented.

However, the first search area 24 does not touch the boundaries of C and E. Therefore, the areas of C and E, but not their perimeters, are used to compute the shape compactness of the boundary 26 of A, B, and D. The shape compactness of the initial set A, B, and D is generated as a first morphological variable using the areas of A, B, and D, and total perimeter of A, B, and D.

Figure 3C:
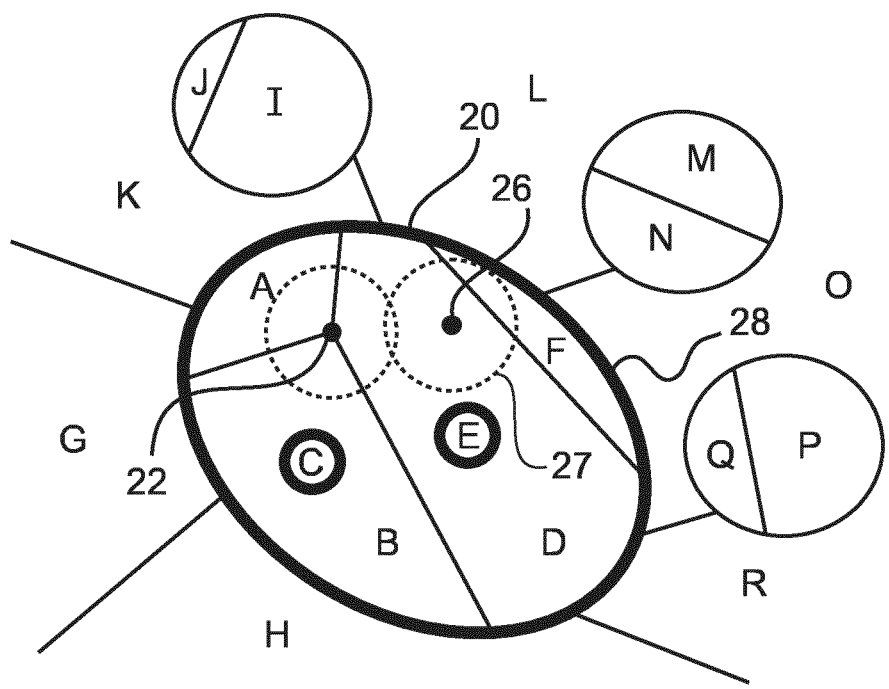

FIG. 3c) shows a subsequent iteration, having a subsequent placement of a second starting location 26 in the digital image information, around which a second search area 27 (in this case a circle) is centred. The search area 27 touches super-pixels F and D. Thus, F and D form a further set of super-pixels. Therefore, the union of the initial set and the further set of super-pixels is A, F, D, and B, having a perimeter as shown by bold line 28. A second morphological variable of the union of the initial set and the further set of super-pixels (A, F, D, and B) is then generated. As the shape compactness of set A, F, D, and B is greater than the shape compactness of A, B, and D, the second morphological variable is greater than the first morphological variable, and the set A, F, D, and B is defined as temporarily being the most suitable estimate of the contour of cell nucleus 20.

Figure 3D:
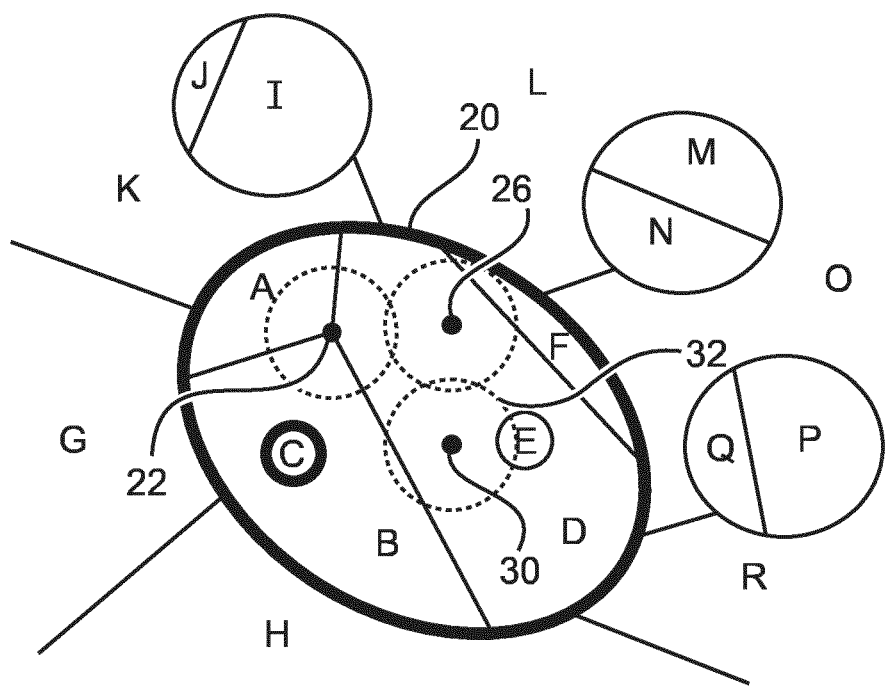

FIG. 3d) shows a subsequent iteration, where a third search area 32 has been placed, centred on a third initial location 30. The third search area 32 touches super-pixels B, D and E. Therefore, super-pixel E is added to the further set of super-pixels. A third morphological variable of this further set of super-pixels is computed. In this case, the third morphological variable increases.

Figure 3E:
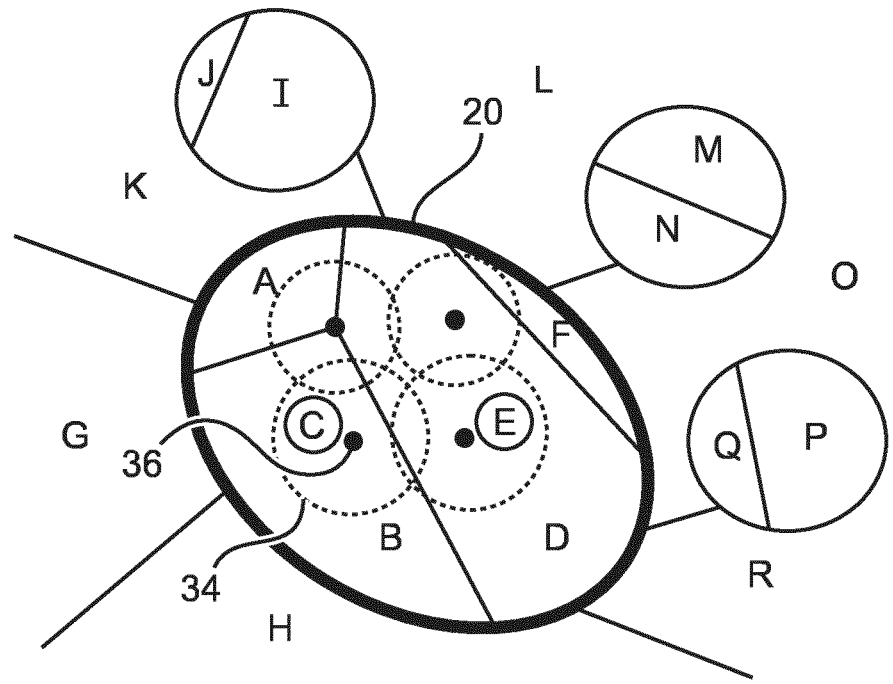

FIG. 3e) shows a subsequent iteration, where a fourth search area 34 has been added centred on a fourth initial location 36. It can be seen that adding the fourth search area 34 would result in a further increase in shape compactness of the cell nucleus 20.

Figure 3F:
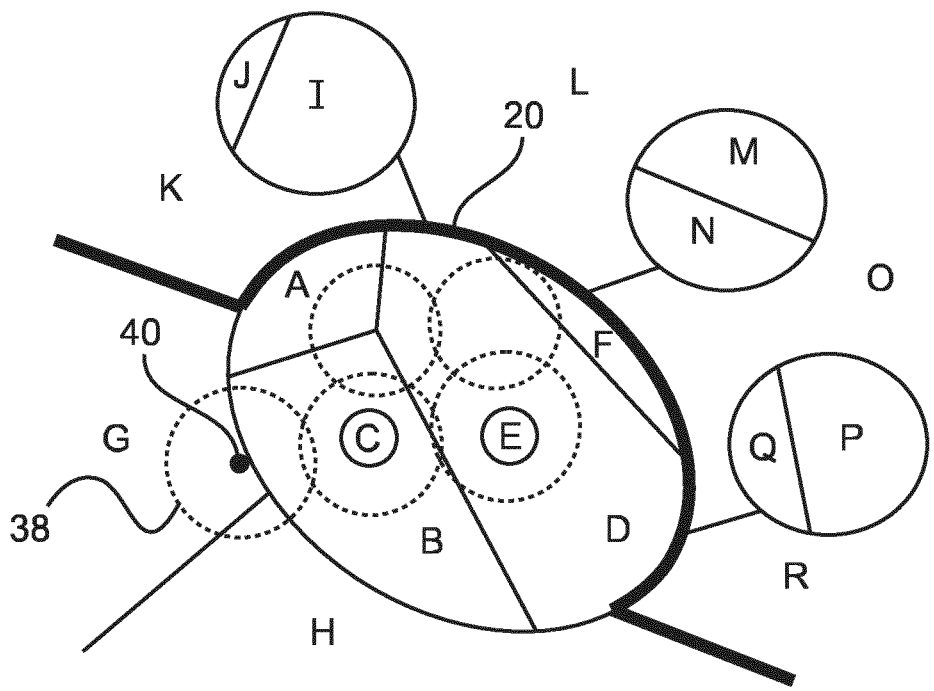

FIG. 3f) shows a subsequent iteration, in which a search area 38 is placed, centred around a fifth initial location 40, causing a morphological variable to be generated involving the set union of the further set (comprising super-pixels G and H) with the present initial set (comprising super-pixels A to F). It can be seen that the addition of the further set of large super-pixels G and H, outside the boundary of the cell nucleus 20, result in a dramatic reduction in shape compactness, because the extra length of super-pixels G and H (the full length is not shown) is much larger than the extra area of super-pixels G and H.

Accordingly, the optimum shape compactness in this situation providing the final candidate nucleus region boundary is reached for the placement of the first four circles.

The example of FIG. 3 placed successive search areas according to an outwardly growing pattern of circles, placed at an increasing distance from an initial start location.

Figure 4A:
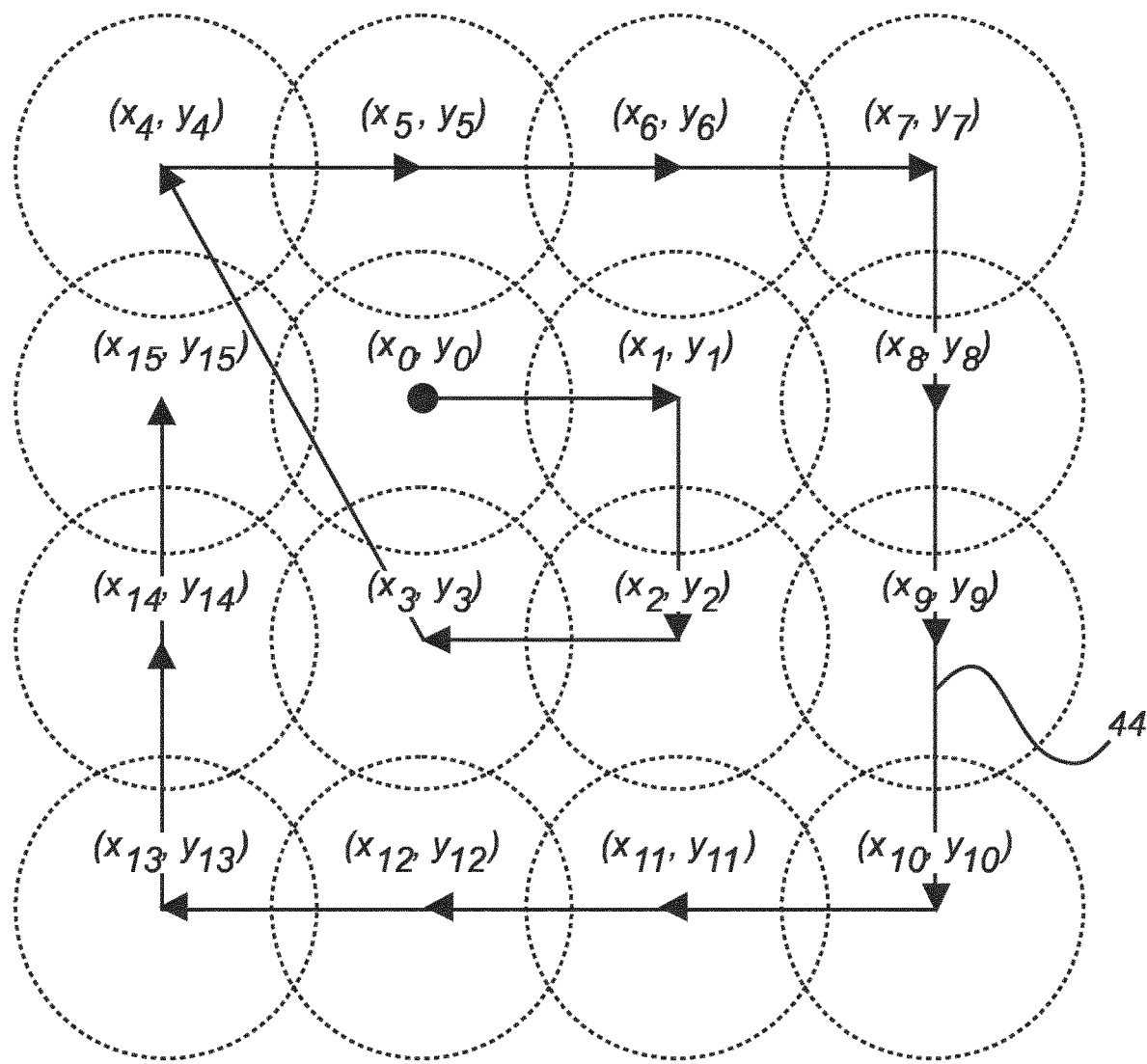
FIGS. 4a) to 4c) show specific examples of search patterns.

FIG. 4a) illustrates an optional search pattern, where location $(x_o, y_o)$ is the first initial location, and the search areas are circles centred about the initial location.

Figure 4B:
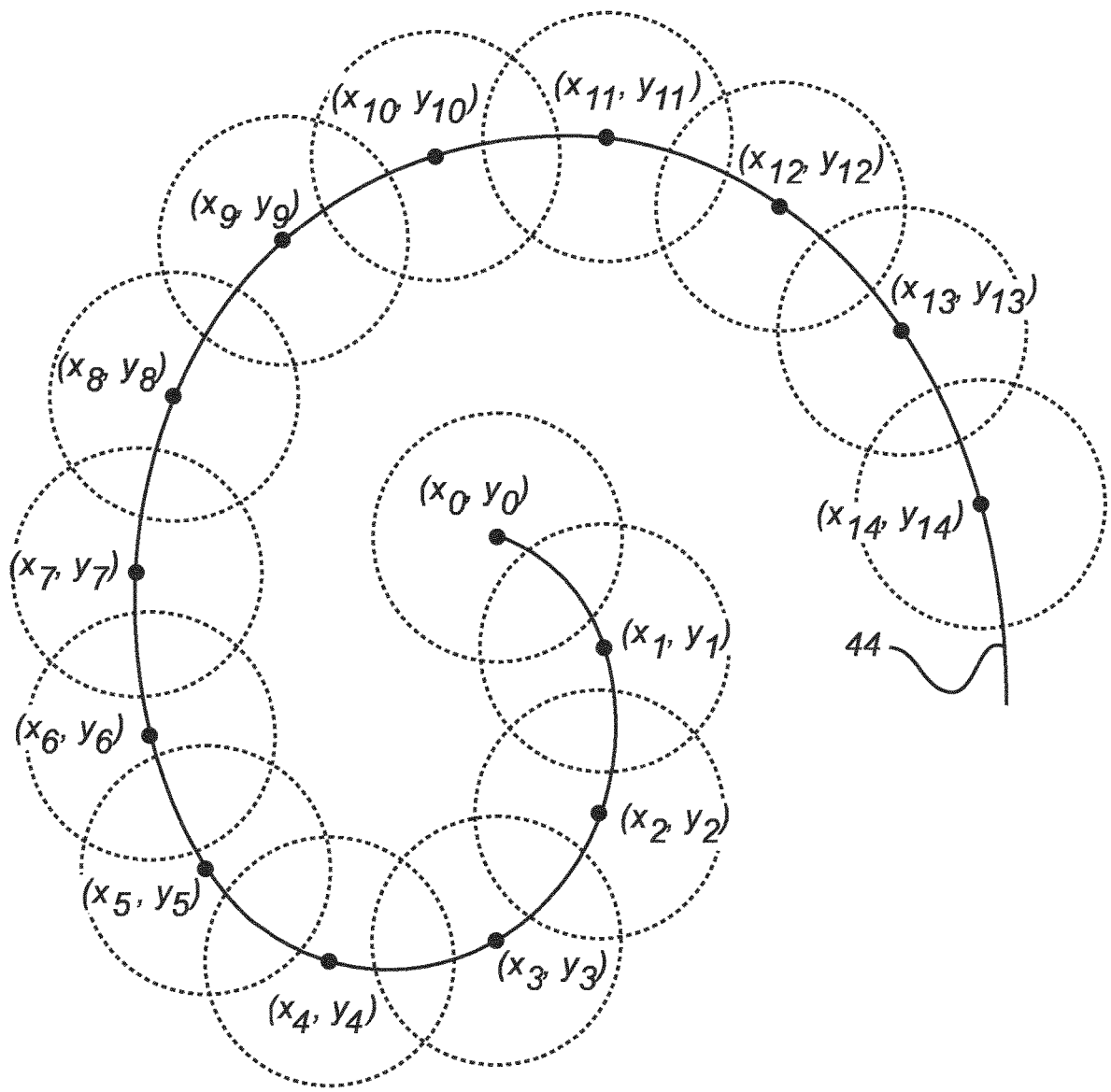

FIG. 4b) demonstrates another optional search pattern, in which the search path 44 is not constrained to a rectangular pattern, but instead follows an outward-spiral (snail-shell) pattern starting at initial location $(x_o, y_o)$, upon which circular search areas are centred.

Figure 4C:
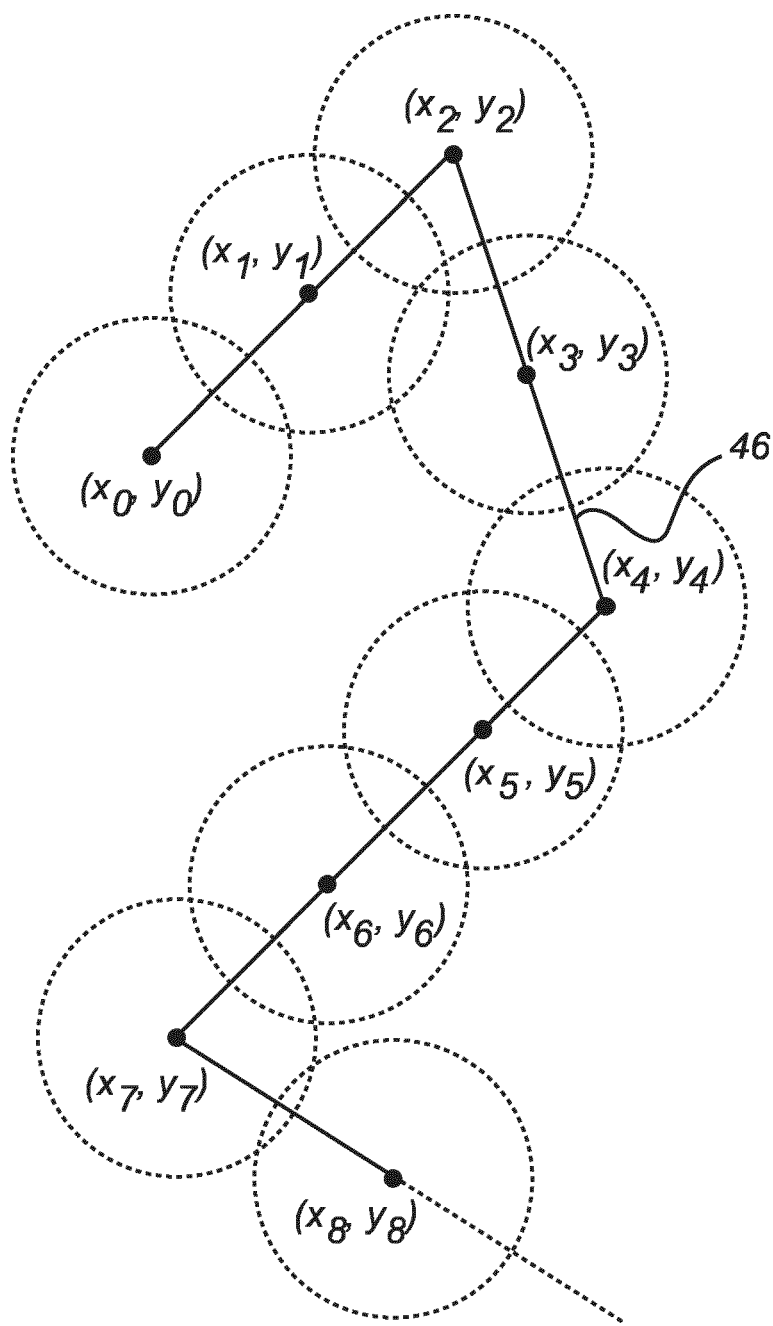

FIG. 4c) shows a random path 46 upon which the search areas are generated. The random path may be generated starting from an initial location $(x_o, y_o)$ using a "random walk" algorithm, for example.

It will be apparent to the skilled person that many other search paths may be provided in the search algorithm.

Many different shapes of search area may be provided, according to embodiments. For example, instead of being circular, the search area may be square, rectangular, or triangular. Optionally, the diameter of the search area may increase in successive steps as the algorithm progresses. Alternatively, the diameter of the search areas may decrease as the algorithm progresses. This enables customization of the algorithm to specific nucleus types.

In an embodiment of the method, in step a) image information is received which has been segmented into super-pixels. The skilled person will appreciate that the segmentation of images into super-pixels is a well-known pre-processing step in image processing. It is one of several alternative approaches to the detection of tissue parts such as cell membranes, cell cytoplasm, and cell nuclei. The super-pixel segmentation approach assumes that neighbouring pixels have similar properties, and can be grouped and clustered into super-pixels, effectively reducing the amount of data for further analysis.

Optionally, in an embodiment, there is the initial step of receiving digital pathology image information which has not been segmented into super-pixels, and segmenting the received digital pathology image information into image information for use in step a) of the method.

Therefore, according to an embodiment, the image processing method is provided, wherein in steps b) and/or d), the selection of the initial set of super pixels and/or the further set of super-pixels is based on:

b1) placing a search area at the initial location and/or the further location;

b2) selecting the initial set and/or the further set of super-pixels as the set of super-pixel regions that touch the search area around the initial location and/or the further location.

According to an embodiment, the first morphological variable is the isoperimetric quotient of the initial set, and the second morphological variable is the isoperimetric quotient of the union of the initial set and the further set.

According to an embodiment, a first morphological variable is the boundary curvature of the initial set, and the second morphological variable is the boundary curvature of the union of the initial set and the further set. Optionally, the boundary curvature is found by summing the boundary curvature over all points on a contour of the initial set and/or the further set.

According to an embodiment, the initial location and the further location are chosen to provide a search path for constraining the placement of the search areas in the image information, wherein the search path is one of: an outward spiral pattern, a random walk; or an outwardly-expanding set of circle perimeters.

According to an embodiment, there is provided the further step of:

a1) receiving, via a user interface, an indication of the initial location; and wherein in step b), the initial set of super-pixels comprises the super-pixel at the initial location.

Selection of the initial position by the user enables a good candidate start position to be found quickly. Preferably, the user interface is a touch-screen. It is then possible for the user to "scroll" around the image information using the touch screen, and to place the indication of the initial location at a location of interest in the image information.

Optionally, a user may place a plurality of initial positions. Optionally, the user interface may be a computer mouse pointer, a keyboard, or a computer track-pad.

According to an embodiment, there is provided the further step of:

b3) generating the initial location using a random process. In step b), the initial set of super-pixels comprises the super-pixel at the initial location.

Accordingly, the algorithm can be started without user supervision.

According to an embodiment, steps a) to f) are repeated iteratively until the second morphological variable reaches a stopping value, or until a pre-set number of iterations have been completed.

Accordingly, in the first case, a specific shape factor, or shape factor range, may be required before the algorithm is stopped, to ensure that a genuine nucleus has been identified, for example. Alternatively, the algorithm may be stopped after a certain number of iterations, which may be specific to a certain type of histopathological context, in order to save processing cycles.

According to an embodiment, there are provided the further steps of:

g) repeating steps a) to f) from a plurality of initial starting positions, thus identifying a plurality of candidate contours.

g1) displaying the plurality of candidate contours to a user;

g2) receiving a user input to select a subset of contours in the plurality of candidate contours.

g3) generating supervised learning information based on the plurality of candidate contours and the selected subset of contours.

The isoperimetric quotient provides a good criterion to such nuclei, but the approach can be further improved by generating multiple candidate nuclei. For example, at a single pixel, there may be different nuclei boundaries from which to select.

Therefore, it is also proposed in an embodiment to provide a supervised learning approach to extract a true boundary from a set of candidate nuclei. An advantage of this is that candidate nuclei enable a segmentation which is often already correct, such that the nucleus boundary absorption features and size features can be accurately evaluated in the final classification task.

According to an embodiment, there is provided the further step:

h) displaying the contour on a user interface.

According to an additional aspect, there is provided a user interface configured to identify a contour of a biological object in image information. The user interface is configured to receive image information which has been segmented into super-pixels, enable the user-selection of an initial set of super-pixels in the image information at an initial location in the image information, and to communicate the user-selection to a processing unit.

The user-interface is further configured to display a contour of the biological object in the image information, if a comparison of the second morphological variable to the first morphological variable by the processing unit indicates that the union of the initial set and the further set have an increased shape compactness compared to the initial set.

A user interface may comprise a touch-pad display, or a PC monitor, for example.

Therefore, the identified contour can be highlighted to the user, for example, by colouring the identified contour in a distinctive colour, to enable the identified contour to be emphasized to enable further inspection.

Optionally, the identified contour is arranged to "persist" in the displayed biological image information as more candidate contours are discovered. Optionally, the identified contour is arranged to "persist" in the displayed biological image information as the user scrolls around the image using a user interface. Optionally, an actuating event, such as tapping on the contour when the contour is displayed on a touchscreen, causes the contour to be hidden from view. Optionally, tapping on an area of the user-interface shaped like a target object, such as a nucleus, causes the contour to be displayed.

According to an embodiment of the second aspect, the user interface receives an actuation event, such as a tap on a touch-screen surface, wherein the touch-screen is displaying the image information. The tap initiates a search for a contour using the above described method of the second aspect, wherein the initial location is provided by the location at which the tap was made on the touch screen. When the contour has been identified using the approach described above, it is displayed to a user. In this way, a user interface is configured to responsively and quickly generate the contours from the initial image information containing super-pixels, "on demand".

According to an embodiment, the user interface receives tracking information, such as a finger-swipe on a touch pad, or a mouse movement, which indicates that a user is "panning" around the field of view of the image information. Then, through an automatic approach, a plurality of candidate locations in the field of view are identified. Optionally, the candidate locations may be identified randomly. Optionally, the candidate locations may be identified according to a seeding algorithm which identifies candidate starting locations based on colour, and/or texture information in the image information. Then, a plurality of candidate nuclei, preferably all nuclei, are identified in the "current" field of view.

Thus, it is possible to generate contours in a field of view containing super-pixels, as a user scrolls around. As discussed, the computational efficiency of the contour-finding approach enables contours to be generated with low latency, which is an important consideration in human-graphical user interface (GUI) interaction.

According to an embodiment, the image information is a microscopic image of a tissue sample, and the contour corresponds to the wall of a cell nucleus.

According to an embodiment, the image information is a microscopic image of a tissue sample, and the contour corresponds to the wall of a broken cell nucleus.

Figure 5:
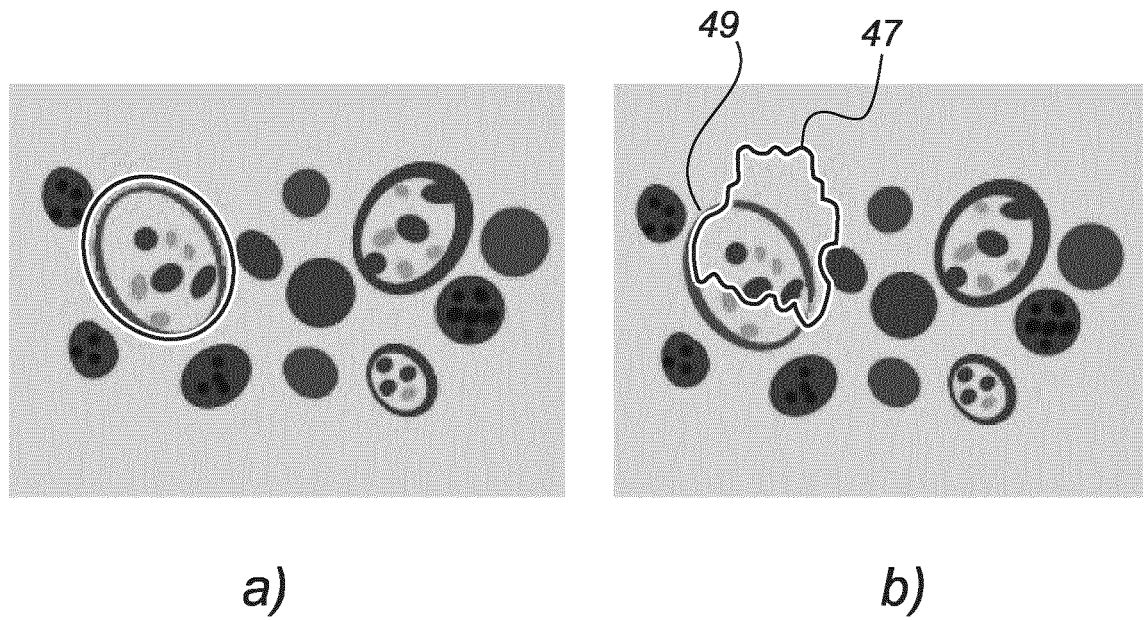
FIGS. 5a) and 5b) show typical results using an example of the proposed search algorithm.

FIGS. 5a) and 5b) illustrate a synthetic H&E image. Super-pixels with different colours were grouped, because colour similarity was not used as a criterion.

In FIG. 5a), a relatively high shape compactness of 0.58 was achieved, as seen by the light coloured line defining the converged algorithm result. This contour will be accepted, because the shape compactness is relatively high.

FIG. 5b) shows a situation where the algorithm converged to a shape compactness of 0.33, a relatively low result, as seen by the line 47 "escaping" from the nucleus 49. This boundary would be rejected, owing to the low shape compactness.

According to a first aspect there is provided a diagnosis assistance system 50 configured to identify a contour of a biological object in image information. The diagnosis system comprises:
   a processing unit 52.

The processing unit is configured to receive image information which has been segmented into super-pixels, to select an initial set of super-pixels in the image information at an initial location in the image information, to determine a first morphological variable of the initial set of super-pixels, to identify a further set of super-pixels adjacent to a super-pixel of the initial set of super-pixels at a further location of the image information, to generate a second morphological variable of the union of the initial set and the further set of super-pixels, and, if a comparison of the second morphological variable to the first morphological variable indicates that the union of the initial set and the further set have an increased shape compactness, to define the contour of the biological object in the image information as the boundary of the union of the initial set and the further set of super-pixels.

Figure 6:
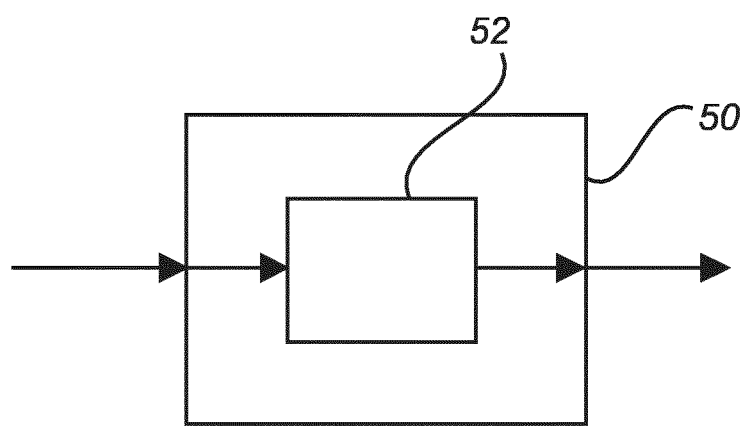
FIG. 6 shows a method according to the second aspect.

FIG. 6 shows a diagnosis assistance system according to the first aspect. The diagnosis assistance system 50 comprises a processing unit 52.

Optionally, the diagnosis assistance system may be embodied as a desktop computing device such as a personal computer. Alternatively, the diagnosis assistance system may be embodied as a touch-screen computing device such as an "iPad"™, or a smartphone. Optionally, the diagnosis assistance system is embodied as a server in a "cloud computing" system.

The processing unit 52 may be one of many digital processing devices capable of performing operations on image information. For example, the processing unit 52 is a general-purpose central processing unit (CPU). Alternatively, the processing unit is a digital signal processor (DSP), or a field programmable gate array (FPGA). Optionally, the processing unit 52 may be a graphics processing unit (GPU). Optionally, the processing unit 52 may be a combination of the previously recited elements. In this way, the identification of a contour of a biological object in the image information may be "offloaded" to a more computationally suitable device.

Figure 7:
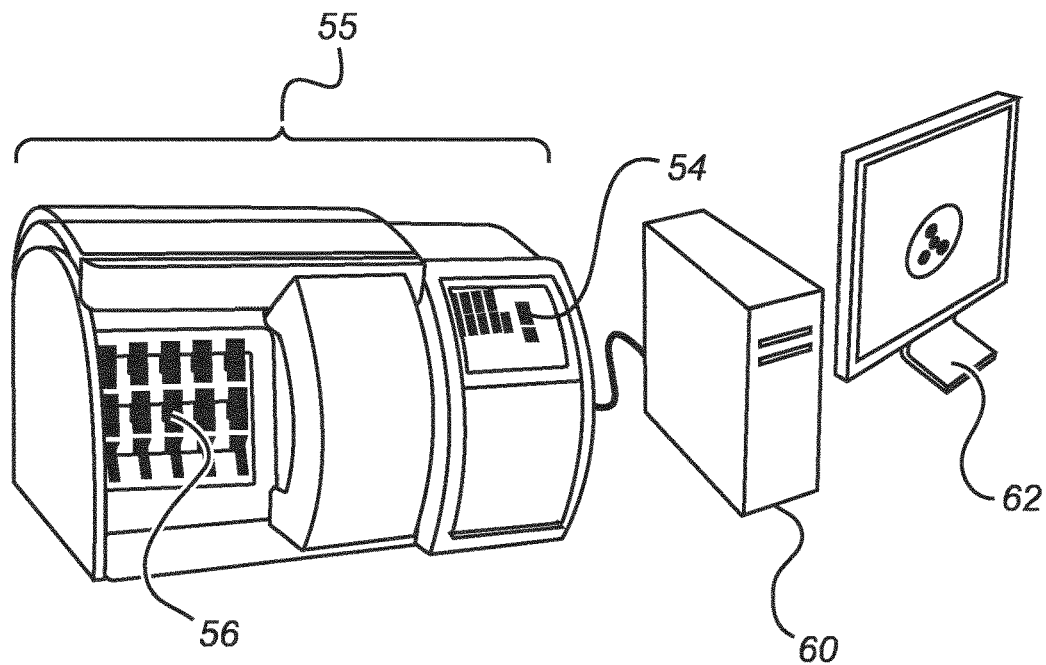
FIG. 7 shows an application of the diagnosis assistance system.

FIG. 7 shows a digital histopathology machine 55 comprising a plurality of sample slots 56 and an interactive user interface 54. Optionally, the digital histopathology machine 55 is connected to a PC 60, which displays the result of a contour identification operation on a display screen 62. Therefore, digital histopathology results may be analyzed quickly, after samples have been put into the machine.

The reduction in computational complexity possible, using the contour identification discussed previously, enables a partitioning of image processing in a "client-server" manner. Super-pixel generation approaches are, generally, relatively computationally intensive.

Alternatively, the contour-finding algorithm detailed herein would be relatively less computationally complex. Thus, one approach is to pre-process the super-pixel finding step on a first device having suitable computationally intensive hardware, and to provide the image information comprising super-pixels to a second device to find and display contours, this reducing the need for the second device to carry a heavy computational load.

Thus, according to a first additional aspect, there is provided a server-side method of processing digital pathology images. The method comprises:
   SP) receiving digital pathology imaging information;
   SQ) applying a super-pixel composition algorithm to the digital pathology imaging information to thus provide a super-pixel image; and
   SR) transmitting the super-pixel image to a client-side device comprising a diagnosis assistance system.

Optionally, the server-side method may be provided inside a digital pathology machine 57. Alternatively, the server-side method may provide for the encrypted upload of images from a digital pathology machine to a database, or to a "cloud" computing service, where the generation of the super-pixels is provided.

According to a second additional aspect, there is provided a client-side method of processing digital pathology images. The method comprises:

CA) receiving a super-pixel image which has been segmented into super-pixels at a server-side device;
CB) selecting an initial set of super-pixels in the super-pixel image at an initial location in the super-pixel image;
CC) determining a first morphological variable of the initial set of super-pixels;
CD) identifying a further set of super-pixels adjacent to a super-pixel of the initial set of super-pixels at a further location in the image information;
CE) generating a second morphological variable of the union of the initial set and the further set of super-pixels;
CF) if a comparison of the second morphological variable to the first morphological variable indicates that the union of the initial set and the further set have an increased shape compactness, to define the contour of the biological object in super-pixel image as the boundary of the union of the initial set and the further set of super-pixels.

According to a third additional aspect, there is provided a server-side communication apparatus that is configured to transmit the super-pixel image to a client-side device comprising a diagnosis assistance system in accordance with the method of the first additional aspect. Optionally, the super-pixel image may be downloaded in an encrypted format from a cloud server.

According to a fourth additional aspect, there is provided a client-side communication apparatus that is configured to receive a super-pixel image which has been segmented into super-pixels at a server-side device, and to define the contour of the biological object in super-pixel image as the boundary of the union of the initial set and the further set of super-pixels, according to the method of the second additional aspect.

Embodiments of the first to fourth additional aspects may comprise any of the subject-matter discussed herein in relation to the first to fourth aspects, or their embodiments.

Accordingly, a contour may quickly be found in a super-pixel image using a touch-pad, or a smartphone, for example, when the super-pixel image has been pre-computed at a server.

Figure 8:
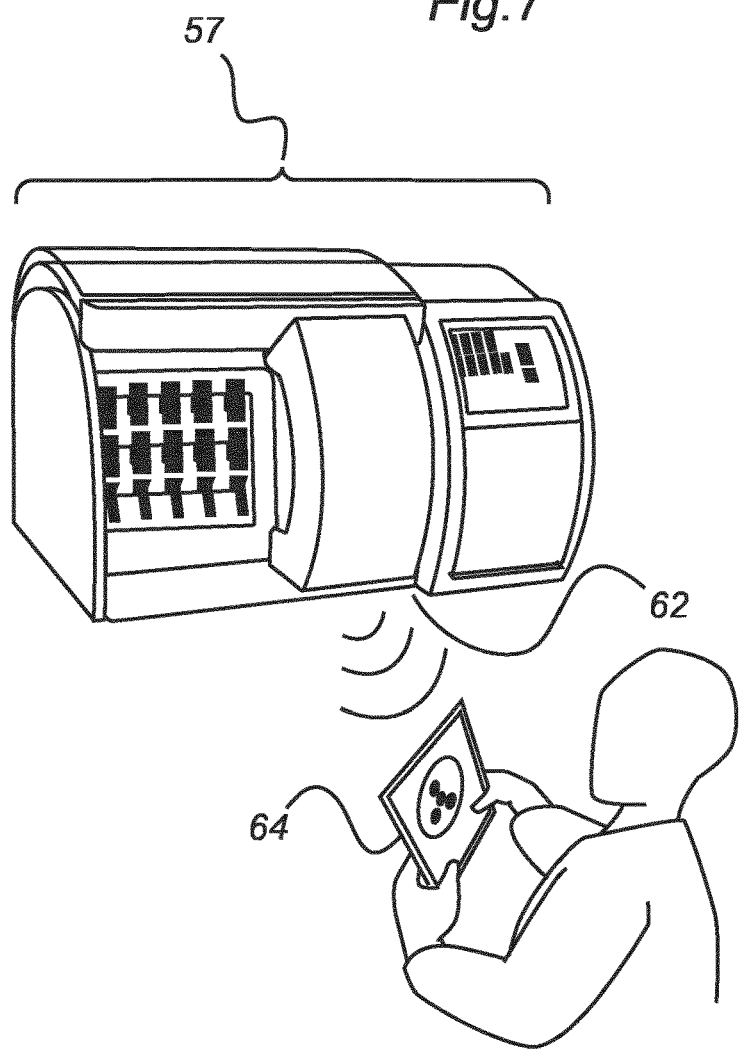
FIG. 8 shows a client-server application of the diagnosis assistance system.

FIG. 8 shows a digital histopathology machine 57 in an embodiment in which it performs the function of the server-side method of processing digital pathology images. Super-pixel information is communicated wirelessly from the digital histopathology machine 57 (which functions as a server in this example) using a wireless transceiver 62. A hand-held client device 64 (in this case, a tablet computer) is configured to communicate with the digital histopathology machine 57 to receive the super-pixel information. A user may scroll around the received super-pixel information, and the client-side algorithm identifies image contours in the super-pixel image in real-time, with minimal latency, because the computationally super-pixel generation step has previously been completed at the server-side, and the reduced-complexity contour finding algorithm is of an appropriate complexity to be executed on the more modest computational hardware to be found on a hand-held tablet.

According to a third aspect, there is provided a computer program element for controlling a processing unit and/or a system as claimed in the first aspect, or its embodiments, which, when the computer program element is executed by the processing unit and, is adapted to perform the method of the second aspect, or its embodiments.

According to a fourth aspect, there is provided a computer readable medium, having stored the computer program element of the third aspect.

A computer program element might therefore be stored on a computer unit, which might also be an embodiment of the present invention. This computing unit may be adapted to perform or induce performance of the steps of the method described above. Moreover, it may be adapted to operate the components of the above-described apparatus.

The computing unit can be adapted to operate automatically and/or execute orders of a user. A computer program may be loaded into the working memory of a data processor. The data processor may thus be equipped to carry out the method of the invention.

This exemplary embodiment of the invention covers both the computer program that has the invention installed from the beginning, and a computer program that by means of an update turns an existing program into a program that uses the invention. A computer program may be stored and/or distributed on a suitable medium, such as an optical storage medium, or a solid state medium supplied together with, or as part of other hardware, but may also be distributed in other forms, such as via the Internet or other wired or wireless telecommunication systems.

However, the computer program may also be presented over a network like the World Wide Web, and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It should to be noted that embodiments of the invention are described with reference to different subject-matters. In particular, some embodiments are described with reference to method-type claims, whereas other embodiments are described with reference to device-type claims. However, a person skilled in the art will gather from the above, and the following description that, unless otherwise notified, in addition to any combination of features belonging to one type of subject-matter, other combination between features relating to different subject-matters is considered to be disclosed with this application.

All features can be combined to provide a synergetic effect that is more than the simple summation of the features.

While the invention has been illustrated and described in detail in the drawings and foregoing description, such illustration and description are to be considered illustrative or exemplary, and not restrictive. The invention is not limited to the disclosed embodiments.

Other variations to the disclosed embodiments can be understood, and effected by those skilled in the art in practicing the claimed invention, from a study of the drawings, the disclosure, and the dependent claims.

In the claims, the word "comprising" does not exclude other elements or steps, and the indefinite article "a" or "an" does not exclude a plurality. A single processor, or other unit, may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A diagnosis assistance system configured to identify a contour of a biological object in image information, comprising:
a processing unit;
wherein the processing unit is configured to:
receive image information which has been segmented into super-pixels,
select an initial set of super-pixels in the image information at an initial location in the image information,
determine a first morphological variable of the initial set of super-pixels,
identify a further set of super-pixels adjacent to a super-pixel of the initial set of super-pixels at a further location in the image information,
generate a second morphological variable of a union of the initial set and the further set of super-pixels, and,
if a comparison of the second morphological variable to the first morphological variable indicates that the union of the initial set and the further set of super-pixels have an increased shape compactness, define the contour of the biological object in the image information as a boundary of the union of the initial set and the further set of super-pixels.

2. The diagnosis assistance system according to claim 1, further comprising:
an input unit;
wherein the input unit is configured to receive an indication of an initial location in the image information from a user, wherein the initial set of super-pixels comprises the super-pixels at the initial location; and
wherein the processing unit is further configured to define the contour that results from applying the search algorithm starting at the initial location.

3. The diagnosis assistance system according to claim 1, wherein the processing unit is further configured to:
generate the initial location using a random process, and wherein the initial set of super-pixels comprises the super-pixels at the initial location.

4. The diagnosis assistance system according to claim 1, wherein the processing unit is further configured to:
select the initial set of super-pixels and/or the further set of super-pixels by placing a search area at the initial location and/or the further location, and
select the initial set and/or the further set of super-pixels as the set of super-pixel regions that touch the search area at least one of the initial location and the further location.

5. The diagnosis assistance system according claim 1, wherein the processing unit is further configured to:
choose the initial location and the further location to provide a search path for constraining the placement of the search areas in the image information, wherein the search path is at least one of: an outward spiral pattern, a random walk, and an outwardly-expanding set of circles.

6. The diagnosis assistance system according claim 1, wherein the processing unit is further configured to:
iterate until the second morphological variable reaches a stopping value, or until a preset number of iterations have been completed.

7. The diagnosis assistance system according to claim 1, wherein the processing unit is further configured to:
generate a plurality of initial locations, and
define a plurality of candidate contours of biological objects in the image information starting from each respective initial location of the plurality of initial locations,
display the plurality of candidate contours to a user,
receive a user input to select a subset of contours in the plurality of candidate contours, and
generate supervised learning information based on the plurality of candidate contours and the selected subset of contours.

8. The diagnosis assistance system according to claim 1, wherein the first morphological variable is the isoperimetric quotient of the initial set, and the second morphological variable is the isoperimetric quotient of the union of the initial set and the further set.

9. The diagnosis assistance system according to claim 1, wherein the image information is a microscopic image of a tissue sample, and the contour corresponds to a wall of a cell nucleus.

10. An image processing method for identifying a contour of a biological object in image information, comprising:
receiving image information which has been segmented into super-pixels;
selecting an initial set of super-pixels in the image information at an initial location in the image information;
determining a first morphological variable of the initial set of super-pixels;
identifying a further set of super-pixels adjacent to a super-pixel of the initial set of super-pixels at a further location in the image information;
generating a second morphological variable of a union of the initial set and the further set of super-pixels;
if a comparison of the second morphological variable to the first morphological variable indicates that the union of the initial set and the further set of super-pixels have an increased shape compactness, defining the contour of the biological object in the image information as a boundary of the union of the initial set and the further set of super-pixels.

11. The image processing method according to claim 10, wherein in at least one of the selecting step and the identifying step, the selection of the initial set of super pixels and/or the further set of super-pixels is based on:
placing a search area at the initial location and/or the further location;
selecting the initial set and/or the further set of super-pixels as the set of super-pixel regions that touch the search area at least one of the initial location and the further location.

12. The image processing method according to claim 10, wherein the first morphological variable is the isoperimetric quotient of the initial set, and the second morphological variable r is the isoperimetric quotient of the union of the initial set and the further set.

13. The image processing method according to claim 10, wherein the initial location and the further location are chosen to provide a search path for constraining the placement of the search areas in the image information, wherein the search path is at least one of: an outward spiral pattern, a random walk and an outwardly-expanding set of circles.

14. A computer program element for controlling a processing unit and/or a system as claimed in claim 1, which, when the computer program element is executed by the processing unit and/or computer, is adapted to perform the method of claim 10.

15. A non-transitory computer readable medium having stored the computer program element of claim 14.

16. A computer program element for controlling a processing unit and/or a system as claimed in claim 1, which, when the computer program element is executed by the processing unit and/or computer, is adapted to perform the method of claim 11.

17. A computer program element for controlling a processing unit and/or a system as claimed in claim 1, which, when the computer program element is executed by the processing unit and/or computer, is adapted to perform the method of claim 12.

18. A computer program element for controlling a processing unit and/or a system as claimed in claim 1, which, when the computer program element is executed by the processing unit and/or computer, is adapted to perform the method of claim 13.

\* \* \* \* \*